(12) United States Patent
Eyal et al.

(10) Patent No.: US 7,636,345 B2
(45) Date of Patent: Dec. 22, 2009

(54) APPARATUS FOR AND METHOD OF TIME RELATED COMMUNICATIONS BETWEEN MULTIPLE DEVICES HAVING DIFFERENT TIME BASES

(75) Inventors: Elad Eyal, Shoham (IL); Oran Segal, Kfar Saba (IL)

(73) Assignee: Comsys Communication & Signal Processing Ltd., Herzelia (IL)

(*) Notice: Subject to any disclaimer, the term of this patent is extended or adjusted under 35 U.S.C. 154(b) by 380 days.

(21) Appl. No.: 11/278,960

(22) Filed: Apr. 6, 2006

(65) Prior Publication Data

US 2007/0183461 A1 Aug. 9, 2007

Related U.S. Application Data

(60) Provisional application No. 60/764,528, filed on Feb. 1, 2006.

(51) Int. Cl.
*H04J 3/06* (2006.01)
*G06F 1/12* (2006.01)
(52) U.S. Cl. ............... 370/350; 713/400; 370/503
(58) Field of Classification Search ............ 370/503, 370/498, 464, 310–350; 713/400; 455/456.1, 455/502
See application file for complete search history.

(56) References Cited

U.S. PATENT DOCUMENTS

| | | | |
|---|---|---|---|
| 5,392,421 A | 2/1995 | Lennartsson | |
| 5,402,394 A | 3/1995 | Turski | |
| 6,836,506 B2 | 12/2004 | Anderson | |
| 6,914,913 B2 | 7/2005 | Sheynman et al. | |
| 6,983,391 B2 * | 1/2006 | Woods et al. | 713/400 |
| 2001/0055980 A1 | 12/2001 | Sato | |
| 2003/0003951 A1 | 1/2003 | Leprieur et al. | |
| 2004/0002346 A1 * | 1/2004 | Santhoff | 455/456.1 |

(Continued)

FOREIGN PATENT DOCUMENTS

WO WO2004/055682 A1 1/2004

OTHER PUBLICATIONS http://scholar.google.com/scholar?q=GPS+and+CDMA,+2005&hl=en&um=1&ie=UTF-8&oi=scholart, 2005.*

*Primary Examiner*—Seema S Rao
*Assistant Examiner*—Wanda Z Russell
(74) *Attorney, Agent, or Firm*—Zaretsky Patent Group PC; Howard Zaretsky

(57) ABSTRACT

A novel and useful apparatus for and method of communicating time related messages between multiple devices wherein each device operates using a different time base. The invention can be applied to multi-mode cellular handsets that implement multiple radio access technologies (RATs). Messages communicated between the RATs are time synchronized using a common time base that is shared among all the RATs in the system. The creation of the shared time base is based on an interrupt signal referred to as a "sync event". The interrupt signal is generated by at least one of the devices and received by all the other devices. The local time is stored in a snapshot register and is used by each respective device as the basis to perform conversions between local and common time, common time being the time base that is shared by all the devices in the system. This 'synchronizes' the devices since they all took a snapshot of their respective local timers at substantially the same time.

34 Claims, 9 Drawing Sheets

U.S. PATENT DOCUMENTS

| | | |
|---|---|---|
| 2004/0054809 A1 | 3/2004 | Goff |
| 2004/0067742 A1 | 4/2004 | Ormson |
| 2004/0185899 A1 | 9/2004 | Hayem et al. |
| 2004/0266435 A1 | 12/2004 | De Jong et al. |
| 2005/0182856 A1 | 8/2005 | Mcknett |
| 2005/0192906 A1* | 9/2005 | Berstis .................... 705/59 |
| 2006/0009187 A1* | 1/2006 | Sheynman et al. .......... 455/318 |
| 2006/0069939 A1* | 3/2006 | Fredriksson et al. ........ 713/400 |
| 2007/0064640 A1 | 3/2007 | Grilli et al. |
| 2007/0110022 A1 | 5/2007 | Palenius et al. |
| 2008/0222661 A1* | 9/2008 | Belyakov .................... 719/321 |

\* cited by examiner

APPARATUS FOR AND METHOD OF TIME RELATED COMMUNICATIONS BETWEEN MULTIPLE DEVICES HAVING DIFFERENT TIME BASES

REFERENCE TO PRIORITY APPLICATION

This application claims priority to U.S. Provisional Application Ser. No. 60/764,528, filed Feb. 1, 2006, entitled "Apparatus For And Method Of Time Related Communications Between Multiple Devices Having Different Time Bases," incorporated herein by reference in its entirety.

FIELD OF THE INVENTION

The present invention relates generally to wireless communication systems and more particularly relates to an apparatus and method for communicating time related messages between multiple devices, each having a different time base.

BACKGROUND OF THE INVENTION

A requirement that often arises in modern communication systems is the need for several devices to communicate time related messages between themselves. A block diagram illustrating an example prior art multi-device system incorporating a separate timer for each device is shown in FIG. 1. The example system, generally referenced 10, comprises three devices 12, labeled device A, B and C. Each device comprises a control unit 14 and timer 16, labeled Control Unit A, B and C and Timer A, B and C, respectively.

In many cases, each of the devices maintains its own time base which (1) may or may not be driven by a hardware clock at a frequency suitable for that device; (2) may or may not be adjusted by the device itself (such as to compensate for drifts due to temperature, etc. or to simplify control of the device); and (3) may suffer from inherent drifts when compared to the timers in other devices. One example of a multi-device system is a multi-mode cellular handset comprising two or more different radio access technology (RAT) PHYs.

In recent years, the world has witnessed explosive growth in the demand for wireless communications and it is predicted that this demand will increase in the future. There are already over 1.5 billion users subscribing to cellular telephone services and the number is continually increasing. The number of GSM users around the world alone has already crossed the 1.2 billion mark, as an example of the increased use of cellular services. One in five people around the world now have a mobile phone and in some developed markets mobile penetration has already approached 100%. It is predicted that by 2010 there will be over 2.3 billion individual wireless subscribers worldwide.

In some countries, the number of cellular subscribers already exceeds the number of fixed line telephone installations. In many cases, the revenues from mobile services exceeds that for fixed line services even though the amount of traffic generated through mobile phones is less than in fixed networks.

Other related wireless technologies have experienced growth similar to that of cellular. For example, cordless telephony, two way radio trunking systems, paging (one way and two way), messaging, wireless local area networks (WLANs), wireless local loops (WLLs), WiMAX and Ultra Wideband (UWB) based MANs.

Currently, the majority of users subscribe to digital cellular networks. Almost all new cellular handsets sold to customers are based on digital technology, typically third generation digital technology. Currently, fourth generation digital networks are being designed and tested which will be able to support much higher data rates. The first generation analog systems comprise the well known protocols AMPS, TACS, etc. The digital systems comprise the second and third generation services GSM/GPRS/EGPRS, TDMA (IS-136), CDMA (IS-95), UMTS (WCDMA), etc. Future fourth generation cellular services are intended to provide mobile data at rates of 100 Mbps or more.

A problem arises in wireless communication systems, however, where different RAT PHY devices within a cellular handset need to communicate time related messages between each other. Since each device operates using its own time base, a mechanism of synchronizing all the different time bases to a common time base shared by all the devices is needed.

SUMMARY OF THE INVENTION

Accordingly, the present invention provides a novel and useful apparatus for and method of communicating time related messages between multiple devices wherein each device operates using a different time base. The present invention is suitable for use with a wide range of systems and is particularly useful in providing inter-device communications in systems that require time synchronized communications between the various devices in the system. A typical application of the shared time base mechanism of the present invention is with multi-mode cellular handsets wherein multiple radio access technologies (RATs), e.g., GSM, WCDMA, etc., are incorporated into the same handset.

To aid in illustrating the principles of the present invention, the apparatus and method are presented in the context of an example communication system including a multi-mode cellular handset that implements both the GSM and WCDMA cellular standards. It is not intended that the scope of the invention be limited to the examples presented herein. One skilled in the art can apply the principles of the present invention to numerous other types of systems (communication and non-communication) as well without departing from the scope of the invention.

The present invention provides a novel mechanism whereby a common time base is created that is shared among all devices in a system. The creation of the shared time base is based on an interrupt signal referred to as a "sync event". This interrupt signal is preferably a real time requirement. The interrupt signal (i.e. the sync event) is generated by at least one of the devices and received by all the other devices. This operation preferably occurs in real time in order to minimize the time between receiving the interrupt and creating the snapshot of the local time. In this manner, all the devices are 'synchronized' in that they all took a snapshot of their respective local timers at substantially the same time. The local time is stored in a snapshot register and is used by each respective device as the basis to perform conversions between local and common time, common time being the time base that is shared by all the devices in the system and which is independent or substantially independent from all local times.

In one embodiment of the invention, the potential for race conditions is eliminated by having each device maintain multiple common time bases rather that just a single time base and toggling between them at each sync event. In the case of two common time bases 'a' and 'b', each is updated alternately each sync event.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the present invention, a method of communicating time related messages between a plurality of devices, the plurality of devices based on different time bases with respect to each other, the method comprising the steps of sending sync events to other devices and sending time related messages to other devices, wherein the time related messages comprise time related data expressed in a common time derived from the sync events.

There is also provided in accordance with the present invention, a method of communicating time related messages between a plurality of devices, the plurality of devices based on different time bases with respect to each other, the method comprising the steps of sending sync events to at least one other device, determining a common time based on a local time the sync event was received and sending time related messages to other devices, wherein the time related messages comprise time related data expressed in the common time.

There is further provided in accordance with the present invention, an apparatus for communicating time related messages comprising a plurality of devices having different time bases with respect to each other, each of the devices comprising a timer, time conversion means, control means coupled to the timer and the time conversion means, wherein the control means operative to trigger a sync event whereby interrupts are sent from the timer in one device to the timers in some or all other devices, wherein the timers operative to register their respective local times upon receipt of the interrupts, wherein the time conversion means on each device is operative to generate and maintain a common time based on respective registered local times and means for sending time related messages from one device to another, wherein the time related message comprises time related data expressed in the common time.

There is also provided in accordance with the present invention, a method of sharing a common time base among a plurality of devices, each device comprising a timer based on a different time base, the method comprising the steps of sending sync event interrupts from the timer in one of the devices to the timers in one or more other devices, all timers registering their respective local times upon receipt of a sync event interrupt and converting, at each device, respective local time to a common time based on the registered local time.

There is further provided in accordance with the present invention, a multi-mode cellular handset for use in a cellular communications network comprising a plurality of modules, each module comprising a timer and time conversion means, each module adapted to transmit and receive a different radio access technology (RAT) signal, inter-module message means coupled to the plurality of modules, the inter-module message means operative to send sync event interrupts from the timer in one of the RAT modules to the timers in one or more other RAT modules, register a respective local time in each RAT module upon receipt of a sync event interrupt, convert, in each RAT module, respective local time to a common time based on the registered local time and send time related messages comprising time related data expressed in the common time from one module to another.

There is also provided in accordance with the present invention, a computer program product characterized by that upon loading it into computer memory a process for communicating time related messages between a plurality of devices based on different time bases is executed, the computer program product comprising a computer useable medium having computer readable program code means embodied in the medium for sharing a common time base among a plurality of devices, each device comprising a timer based on a different time base with respect to each other, the computer program product comprising computer readable program code means for sending sync event interrupts from the timer in one device to the timers in one or more other devices, computer readable program code means for registering the respective local times of each timer upon receipt of a sync event interrupt, computer readable program code means for converting, at each device, respective local time to a common time based on the registered local time and computer readable program code means for sending time related messages comprising time related data expressed in the common time between the plurality of devices.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| AMPS | Advanced Mobile Telephone System |
| ASIC | Application Specific Integrated Circuit |
| ASSP | Application Specific Standard Products |
| CDMA | Code Division Multiple Access |
| CD-ROM | Compact Disc Read Only Memory |
| CPU | Central Processing Unit |
| DSP | Digital Signal Processor |
| EDGE | Enhanced Data for Global Evolution |
| EEROM | Electrically Erasable Read Only Memory |
| EGPRS | Enhanced General Packet Radio System |
| FDD | Frequency Division Duplex |
| FPGA | Field Programmable Gate Array |
| FTP | File Transfer Protocol |
| GPRS | General Packet Radio System |
| GSM | Global System for Mobile Communication |
| HDL | Hardware Description Language |
| HTTP | Hyper Text Transport Protocol |
| MAN | Metropolitan Area Network |
| MS | Mobile Station |
| PHY | Physical Layer |
| PIM | Personal Information Manager |
| RAM | Random Access Memory |
| RAT | Radio Access Technology |
| RF | Radio Frequency |
| ROM | Read Only Memory |
| TACS | Total Access Communications Systems |
| TCL | Time Conversion Library |
| TDMA | Time Division Multiple Access |
| UMTS | Universal Mobile Telecommunications System |
| UWB | Ultrawideband |
| WCDMA | Wideband Code Division Multiple Access |
| WiMAX | Worldwide Interoperability for Microwave Access |
| WLAN | Wireless Local Area Network |
| WLL | Wireless Local Loop |

Detailed Description of the Invention

The present invention is an apparatus for and method of communicating time related messages between multiple devices wherein each device operates using a different time base.

The present invention is suitable for use with a wide range of systems and is particularly useful in providing inter-device communications in systems that require time synchronized communications between the various devices in the system. A typical application of the shared time base mechanism of the present invention is with multi-mode cellular handsets wherein multiple radio access technologies (RATs), e.g., GSM, WCDMA, etc., are incorporated into the same handset.

To aid in illustrating the principles of the present invention, the apparatus and method are presented in the context of a multi-mode cellular handset. It is not intended that the scope of the invention be limited to the examples presented herein. One skilled in the art can apply the principles of the present invention to numerous other types of communication systems as well without departing from the scope of the invention.

Note that the handset configuration presented herein is intended for illustration purposes only and is not meant to limit the scope of the present invention. It is appreciated that one skilled in the communication and signal processing arts can apply the shared time base mechanism of the present invention to numerous other handset topologies and communication schemes as well.

Figure 1:
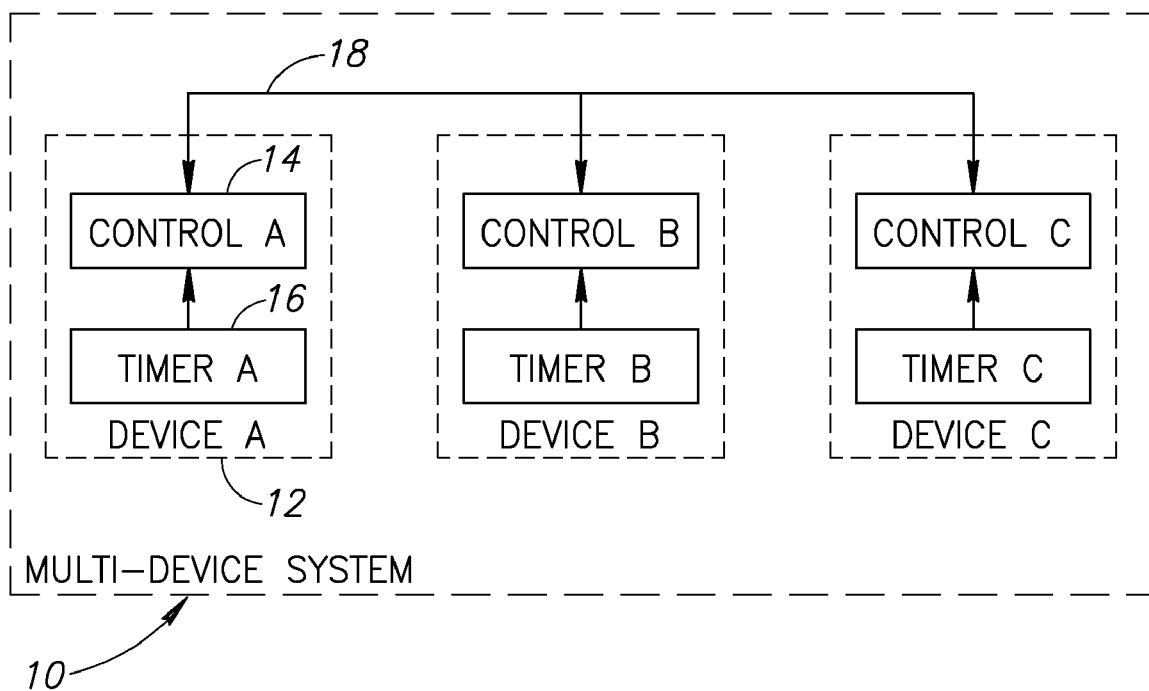
FIG. 1 is a block diagram illustrating an example prior art multi-device system incorporating a separate timer for each device.
Figure 2:
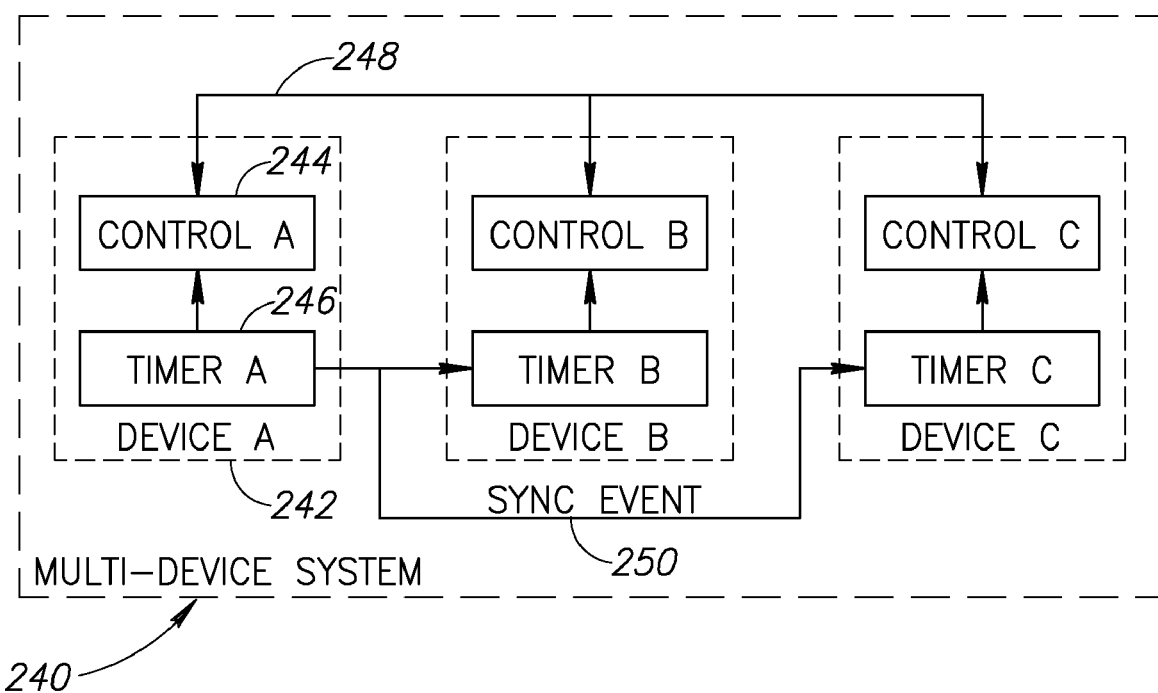
FIG. 2 is a block diagram illustrating an example multi-device system incorporating the multi-time base communications scheme of the present invention.

A block diagram illustrating an example multi-device system incorporating the multi-time base communications scheme of the present invention is shown in FIG. 2. The system, generally referenced 240, comprises a plurality of devices 242, labeled Device A, B and C. Each device comprises its own control unit 244 and timer 246, labeled Control Unit A, B and C and Timer A, B and C, respectively. Such a system may be implemented in communication devices such as cellular handsets but may also be implemented in non-communication based devices as well.

Each of the devices 242 maintains its own time base which (1) may or may not be driven by a hardware clock at a frequency suitable for that device; (2) may or may not be adjusted by the device itself (such as to compensate for drifts due to temperature, etc. or to simplify control of the device); and (3) may suffer from inherent drifts when compared to the timers in other devices.

In accordance with the invention, an interrupt 250 (referred to as a 'sync event') is generated by one of the devices and sent to one or more of the other devices. The system is adapted such that the sync event arrives at all devices simultaneously or near simultaneously. The sync event can be generated by one or more of the devices, by one or more external modules or by at least one device and at least one external module. In the example system of FIG. 2, Device A is adapted to generate the interrupt which is sent to and received by the other two devices, namely Devices B and C.

In operation, each of the devices maintains its own local time based on its own individual timer. The sync events are used by each of the devices to convert from local time to a common time. It is this common time that is used in sending time related entities between the devices via inter-device messages, as described in more detail infra.

Figure 3:
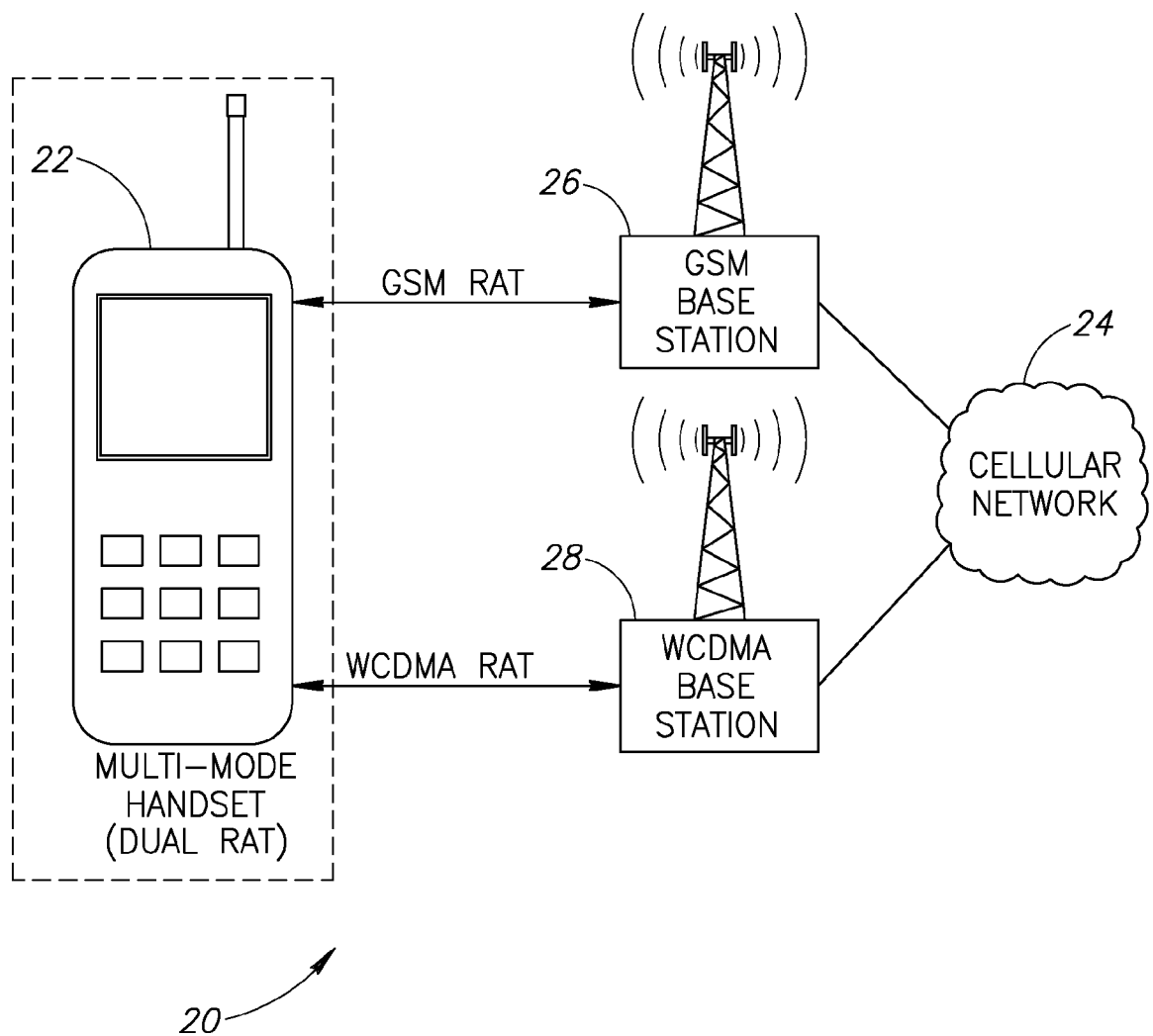
FIG. 3 is a diagram illustrating an example mobile system incorporating a multi-mode handset and multiple base stations.

A diagram illustrating an example mobile system incorporating a multi-mode handset and multiple base stations is shown in FIG. 3. The example cellular network, generally referenced 20, comprises a multi-mode handset 22, GSM base station 26 and WCDMA base station 28 both coupled to the cellular network 24.

The handset is a dual radio access technology (RAT) handset as it is operative to support (e.g., transmit and receive) both GSM and WCDMA radio access technologies. In operation, the GSM PHY module in the handset communicates with the GSM base station using GSM RAT while the WCDMA PHY module in the handset communicates with the WCDMA base station using WCDMA RAT.

The dual RAT handset is one example of a multi-device system wherein the devices require synchronized communication of time related messages between themselves. The cellular handset in this example is defined as a "Type 2 Multi-mode MS" in accordance with clause 4 of the 3GPP Technical Standard 21.910, incorporated herein by reference. Such a mobile station (MS) can use two different RATs to gain access to a single cellular network, as shown in FIG. 3. Alternatively, the mobile system is also capable of using the two different RATs to gain access to two or more distinct cellular networks.

Figure 4:
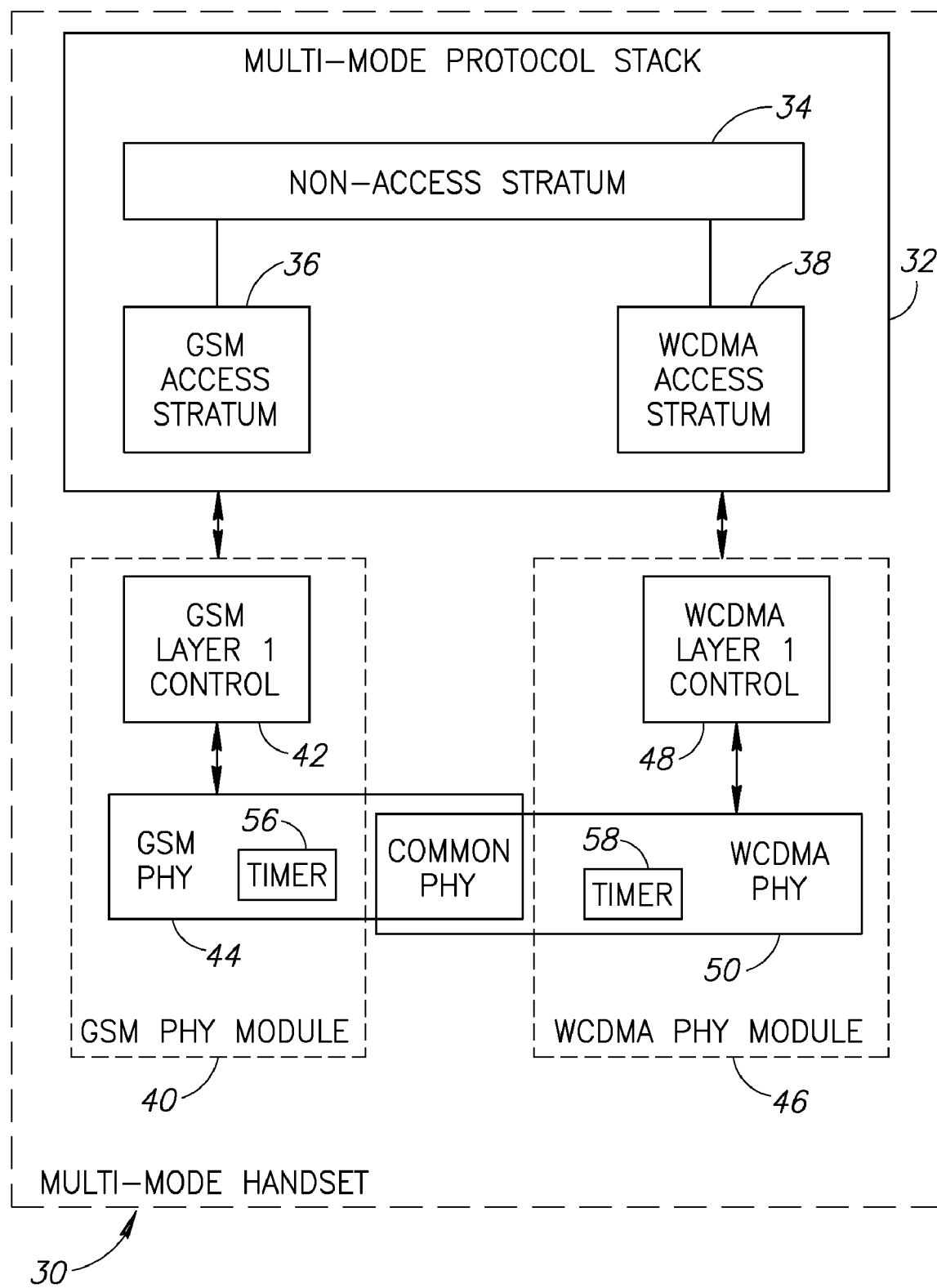
FIG. 4 is a block diagram illustrating a first embodiment of a multi-mode handset constructed in accordance with the present invention.

The pertinent components of the mobile system of FIG. 3 will now be described in more detail. A block diagram illustrating a first embodiment of a multi-mode handset constructed in accordance with the present invention is shown in FIG. 4. The multi-mode handset, generally referenced 30, comprises a multi-mode protocol stack 32, GSM PHY module 40 and WCDMA PHY module 46. The multi-mode (dual-RAT) protocol stack 32 comprises a Non-Access Stratum 34, which provides upper layer signaling, in a manner indifferent to the specific Access Technology in use. The protocol stack also comprises a GSM Access Stratum 36 and a WCDMA Access Stratum 38. Each Access Stratum performs tasks specific to its respective RAT and also provide services to the Non-Access Stratum.

The GSM PHY module 40 and the WCDMA PHY module 46, enable the radio access in each RAT. The PHY modules comprise IP blocks, Integrated Circuits (ICs), software, hardware sets or a combination of any of the above implementing all or a part of the RAT receive and transmit path. The GSM PHY module comprises Layer 1 control 42 and PHY hardware and software 44. The Layer 1 control block may be implemented in hardware, software or a combination of hardware and software. The WCDMA PHY module comprises Layer 1 control 48 and PHY hardware and software 50. The Layer 1 control block may be implemented in hardware, software or a combination of hardware and software.

Note that GSM and WCDMA PHYs may overlap whereby a portion of the PHY is shared between the GSM PHY and the WCDMA PHY. An advantage of sharing a portion of the PHY is lower costs for the mobile station. The shared part of the PHY is referred as the common PHY. Each of the PHYs also comprises a hardware based timer also referred to as a RAT timer. The timer 56 in the GSM PHY module typically counts in GSM-related time units (e.g., the GSM symbol rate which is approximately 270,833 symbols/sec). The timer 58 in the WCDMA PHY module typically counts in WCDMA-related time units (e.g., the FDD chip rate which is approximately 3.84 Mcps).

Each timer typically (1) is driven by a clock at a frequency suitable to that particular RAT; (2) may be adjusted by the RAT either to compensate for drifts or to simplify control; and (3) suffers from inherent drifts when compared to the other RAT timer(s).

There are times when it is required to communicate time related messages between the two PHYs. Consider the scenario when the handset is maintaining a voice conversation using the GSM network. At certain points in time, the handset is required to use the WCDMA PHY to monitor for neighboring WCDMA cells. In this example, the GSM RAT is termed the active RAT and the WCDMA RAT is referred to as the monitoring RAT. If a neighboring WCDMA cell is found to provide better signal quality than the currently serving GSM cell, the handset may be required to change to the WCDMA cell, thus changing the active RAT to the WCDMA RAT. Since a portion of the PHY is shared, the handset preferably only performs WCDMA monitoring at times the GSM PHY is not being used, i.e. at times in which the GSM base station does not expect the handset to transmit or receive any information over the radio interface. The counterpart case in which the active RAT is WCDMA and the monitoring RAT is GSM is similar, whereby if a neighboring GSM cell is found to provide better signal quality than the currently serving WCDMA cell, the handset may be required to change to the GSM cell, thus changing the active RAT to the GSM RAT. Note that there are other scenarios in which monitoring is performed using the monitoring RAT.

Thus some type of time coordination between the two PHYs is needed. One method to achieve this time coordination is to use a single timer instead of individual timers for the two PHY modules. This single timer then becomes an integral part of the common PHY. The single timer is able to provide services to both PHYs. This is achieved, for example, by counting using a frequency suitable for both RATs. In this case, both RATs utilize a single time base.

Another method is to use two timers enclosed in a single entity with co-dependencies. Each of the interconnected timers provides services to its respective PHY. The connection between the timers is used to synchronize them. The interconnection can be implemented in hardware, software or partly in hardware and software. If it is implemented all or partly in software then the software part is substantially a shared component of the Layer 1 control software unit in each PHY.

Yet another method is to establish two timers in the handset. In this method, however, only the timer of the active RAT is used to time operations in both RATs. Thus, both RATs use the time base of the active RAT. When the active RAT is switched to another RAT, the timer of that RAT is then used to time operations in both RATs.

In a preferred embodiment, the invention provides a mechanism to establish a shared common time base that is used by all the devices in a system. To aid in illustrating the principles of the present invention, the time based sharing mechanism is described in the context of a multi-mode cellular handset. It is not intended that the invention be limited to the examples provided herein. It is appreciated that one skilled in the art can apply the principles of the present invention to systems other that shown herein without departing from the scope of the invention.

In accordance with the invention, a shared time base is created which can be used, for example, by the active RAT in a multi-mode cellular handset to notify each of the monitoring RATs of any time windows allocated to it for performing measurements, e.g., reception quality, etc. An advantage of the invention is that it requires virtually no hardware modifications and almost no modifications to the manner in which each device manages its timer.

Figure 5:
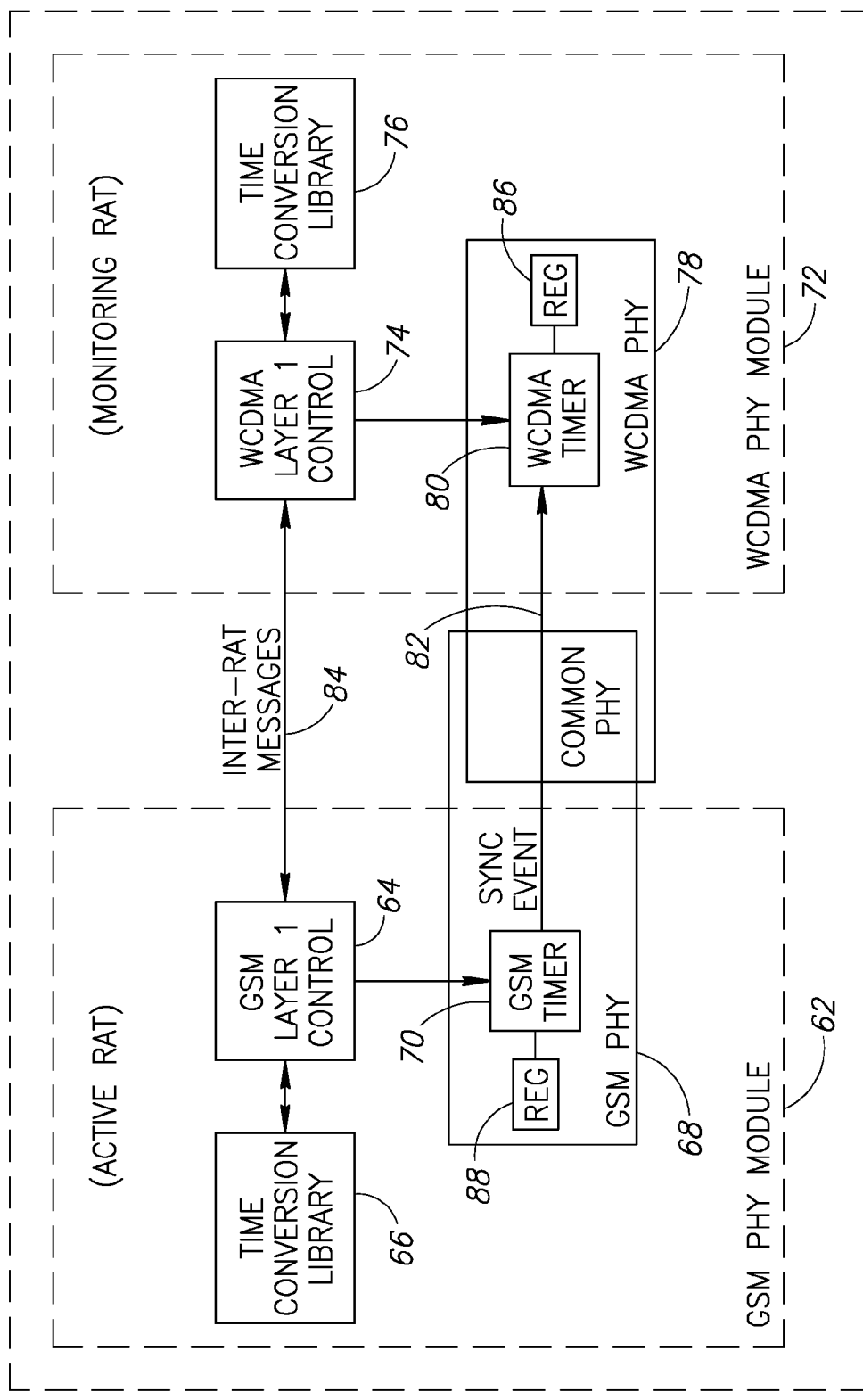
FIG. 5 is a block diagram illustrating a second embodiment of a dual-mode handset constructed in accordance with the present invention.

A block diagram illustrating a second embodiment of a dual-mode handset constructed in accordance with the present invention is shown in FIG. 5. The multi-mode handset, generally referenced 60, comprises two PHY modules: a GSM PHY module 62 and a WCDMA PHY module 72. Note that this dual-RAT handset is provided for illustration purposes. It is appreciated that the invention is not limited to this dual-RAT example as the invention can be applied to handsets having number and type of PHY devices and to systems other than cellular handsets as well.

Each of the PHY modules comprises Layer 1 control hardware/software, a timer and a time conversion library. In particular, the GSM PHY module 62 comprises Layer 1 control 64, GSM PHY 68 and a time conversion library (TCL) 66. The GSM PHY comprises a timer 70 and register 88. The WCDMA PHY module 72 comprises Layer 1 control 74, WCDMA PHY 78 and a time conversion library (TCL) 76. The WCDMA PHY comprises a timer 80 and register 86. In this example, GSM is the active RAT while WCDMA is the monitoring RAT.

The creation of the shared time base is based on an interrupt signal referred to as a "sync event". This interrupt signal is a real time or near real-time requirement. If the interrupt is not generated and received in real time, the accuracy and performance of the invention may be reduced. Note that the term interrupt is intended to mean a conventional interrupt, a signal, a message or any other suitable notification mechanism.

Throughout this document, the term "local time" is defined as the time based on an individual RAT or individual device. Local time is in the format of, maintained by and understood by each individual RAT or individual device in the system. The term "common time" is based on a common time base that is shared among all the RATs or individual devices in the system. The time conversion library (TCL) in each PHY module functions to perform the conversion from local time to common time and from common time to local time.

In general, the mechanism operates by first triggering a sync event 82. The sync event interrupt is received by the RATs and in response, each takes a snapshot of its local time. This operation preferably occurs in real time in order to minimize the time between receiving the interrupt and creating the snapshot of the local time. In this manner, all the RATs are 'synchronized' in that they all took a snapshot of their respective local timers at substantially the same time. The local time is stored in a snapshot register and is used by each respective TCL as the basis to perform conversions between local and common time. Note that the invention is not limited to use of a snapshot register, as it is contemplated that other techniques known in the art can be used to store local time.

Note that it is not critical to the invention how and by whom the sync event is generated. In one alternative embodiment of the present invention, one of the devices (the GSM device in FIG. 5) is programmed to generate and send, either on a periodic or non-periodic basis, the sync event interrupt to the other timers (i.e. the WCDMA timer). In a second alternative embodiment of the present invention, an additional or external unit triggers and/or generates the sync event interrupt to some or all of the timers in the system. Note that the term 'external' is intended to mean either a separate physical module, package, IC, etc. or as a different module not described herein.

In a third alternative embodiment of the present invention, the system comprises a plurality of units and/or devices, each of which triggers and generates sync event interrupts on an alternating basis. In yet another alternative embodiment, sync events are triggered by at least one device and at least one external device. Note that the term 'alternately' can denote every other (i.e. ababab) or may denote approximately every other with repetitions possible (i.e. aaaabbbbaaaabbbb). In any case, the term 'alternately,' does not suggest any predetermined regulation or pattern whereby the identity of the entity generating the sync interrupt may change at various unrelated times. In one example, the entity generating the sync interrupt may change in accordance with the active RAT (which only changes occasionally).

It is noted that the sync event interrupt may or may not arrive simultaneously to all devices. In one alternative embodiment of the present invention, the sync event interrupt occurs in all timers substantially simultaneously in real time or near real time. The instant in time of each such interrupt is denoted t0.

In a second alternative embodiment of the present invention, the interrupt is received in different timers at times that are not simultaneous but sufficiently close enough in time such that the perceived synchronization error that results in the devices is sufficiently small enough to permit all devices to meet their respective performance requirements.

In a third alternative embodiment of the present invention, a device may receive the sync event with a delay with respect to some other trigger, such as the sync event received by another device. In this case, the device is able to calculate local time at the moment in time of that trigger whereby that trigger is then used to define t0.

When a device receives (or generates) the sync event, it locally stores a snapshot of the local time thus defining time t0 in terms of local time. This time snapshot is available for later use by the Layer 1 device control in each PHY module.

The sync event interrupt defines t0 and this time defines a time base referred to as common time. Common time is the time base which is used for all inter-device communications. It is important to note that common time is independent or substantially independent from all local times. Further, the invention is not limited to the use of any particular units with the common time base. Messages that are communicated between devices use time stamps expressed in common time. The time stamps are expressed in time units since t0. The time units may be any suitable units such as seconds, milliseconds, microseconds, etc. When any of the devices wish to communicate a time entity to another device, it first converts the time entity, which is internally expressed in the local time of the device, to common time. The target device uses its time conversion library (TCL) to convert the time entity in the received message expressed in common time to a time entity expressed in its own local time.

The conversion between local time and common time by each RAT is performed in a straightforward manner because (1) the local time at time t0 s known; and (2) the rate at which the device timer counts is also known. Note that it is possible for the Layer 1 device control to interfere with the counting of the device timer. In such a case, the device Layer 1 control is still able to convert local time to common time because it has knowledge of any such interferences.

Note also that there is no requirement for the sync event interrupts to be issued at a fixed frequency. It is noted that the time between two consecutive sync events do not necessarily need to be known a priori or repeat themselves. It is required, however, that the time between any two consecutive sync events be less than TSS time apart. The value of TSS is chosen in an implementation of the invention such that any adjustments of each device timer necessary to compensate for drifts across a single sync event can be neglected by the Layer 1 control. Typically, the value of the parameter TSS can be derived from the overall system performance requirements and from the characteristics of the particular device timer. Note further that it is assumed that the timer corrections accumulated from the time a timestamp Q is provided to a device until the time Q arrives physically (actually) is substantially negligible.

With reference to FIG. 5, the dual-RAT handset is an example of a multi-mode handset, in which the GSM is the active RAT. Thus, the GSM PHY module is the device that generates and triggers the sync event interrupt. The sync event interrupt 82 is received by the WCDMA timer in the WCDMA PHY.

In some cases, there may be arbitrarily long gaps in time between the time each device timer generates or receives the sync event interrupt and the time each device control is ready to process common time based messages using the newly defined common time base. These gaps in time are due to the asynchronous nature of some of the processing performed within each device. These time gaps would normally create opportunities for race conditions in which the time stamps in messages generated by one device (i.e. RAT) are unusable by another device (i.e. RAT). Potential race conditions thus need to be avoided.

The invention provides several mechanisms that can be used to avoid race conditions from occurring. One method for eliminating potential race conditions is to add additional real time requirements to the system. This method, however, may be too burdensome depending on the particular application. A second method for eliminating potential race conditions is to prevent the creation of common time messages for a certain period of time before and after a sync event is due.

A third method for eliminating potential race conditions, is to maintain two or more common time bases and alternate between them. An example implementation of this third method is provided herein and described in more detail infra. In the example provided herein, the time conversion library (TCL) in each PHY module is adapted to maintain two common time bases: an 'a' time base and a 'b' time base. The operation of this mechanism in a two-device setup (i.e. dual RAT handset) is described infra. Note that no additional real time requirements are necessary to implement a multiple common time base scheme.

In operation, each device utilizes its own TCL. With reference to FIG. 5, the GSM RAT uses TCL 66 while the WCDMA RAT uses TCL 76. Each TCL is operative to translate timestamps between local time (which is used by the device) and common time as defined above. In order to perform this conversion, each TCL requires the following inputs from the Layer 1 control of its respective device:

1. the local time at time t0.
2. any adjustments or corrections to the timer made by the Layer 1 control of the device.

Thus, in accordance with the invention, the TCLs in the devices do not need to communicate between themselves and thus do not add any real-time requirements to the system.

The only added burden placed on each device is that each TCL now manages two values for t0 rather than a single value. The two values for t0 managed by each TCL are denoted $t_a$ and $t_b$ which are identified by SyID='a' and SyID='b', respectively. At every sync event the SyID is toggled and consequentially defines either $t_a$ or $t_b$. Common time is thus expressed by a combination of (1) SyID and (2) time since tSyID (i.e. either $t_a$ or $t_b$). Each TCL is operative to translate common time to local time tagged with either SyID, using the most recent relevant update.

Figure 6:
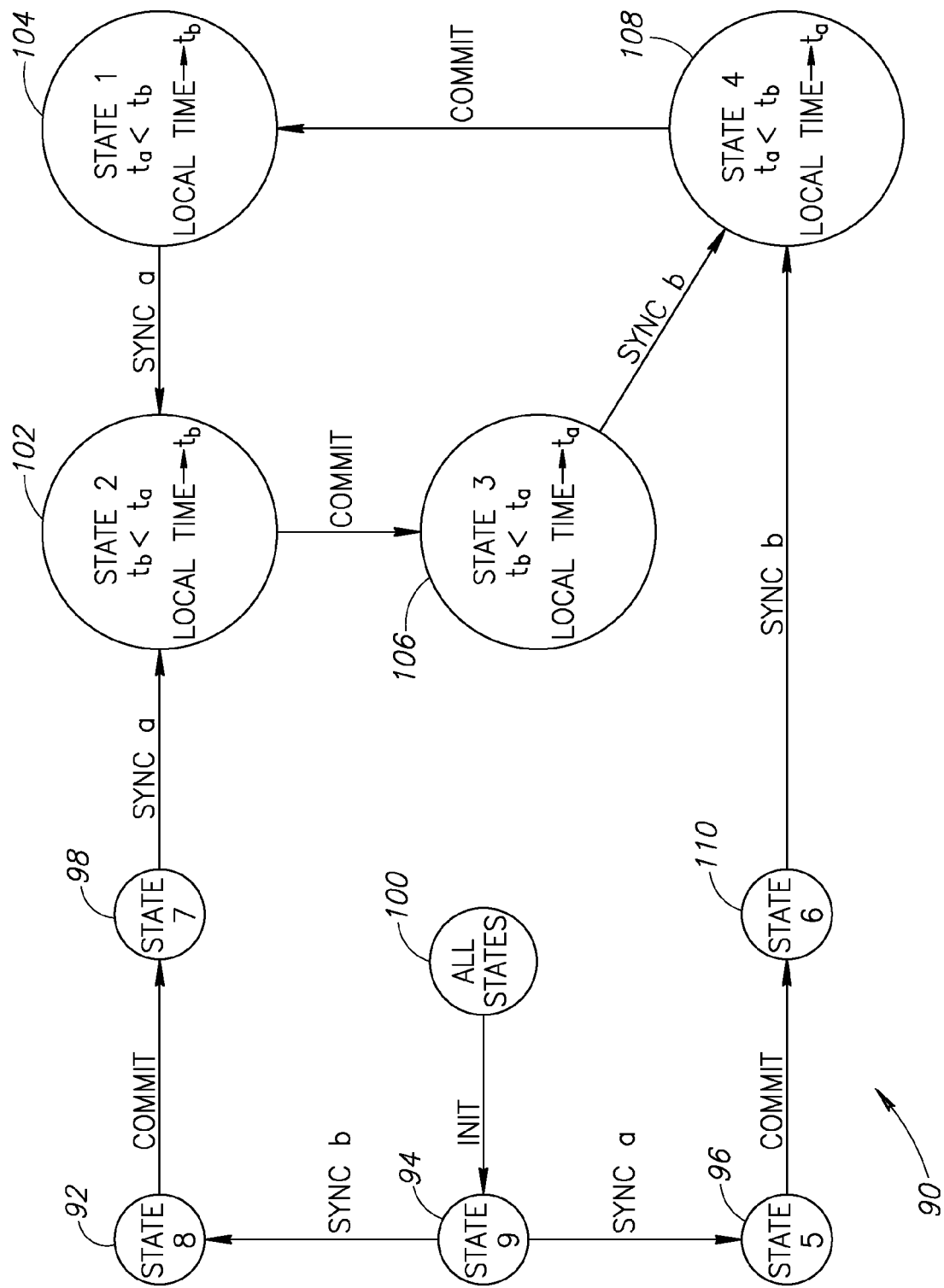
FIG. 6 is a state transition diagram illustrating the state machine implementing the time conversion library (TCL) of the present invention.

A state transition diagram illustrating the state machine implementing the time conversion library (TCL) of the present invention is shown in FIG. 6. The state machine, generally referenced 90, is implemented in each TCL. The example state machine shown is for the case of a TCL adapted to maintain two common time bases. It is appreciated that a state machine adapted to handle additional common time bases can be constructed in similar fashion to that shown herein. In practice, however, two time bases are typically sufficient even if there are more than two devices to be time synchronized.

In response to an initialization command INIT while in any state (100), the initialization state (State 9) 94 is entered. In the initialization state, the TCL is unable to perform any time base conversions. In State 5 (96), State 6 (110), State 8 (92) and State 7 (98) the TCL collects information about the first few sync event interrupts but is still unable to perform time base conversions. A sync event with SyID ='a'(denoted 'SYNC A') causes a transition from State 9 to State 5. At some point in time after receiving the interrupt, the device 'commits' to the new time base 'a' and transitions from State 5 to State 6. Similarly, a sync event with SyID ='b'(denoted 'SYNC B') causes a transition from State 9 to State 8. At some point in time after receiving the interrupt, the device 'commits'to the new time base 'b'and transitions from State 8 to State 7.

State 1 (104), State 2 (102), State 3 (106) and State 4 (108) are the steady states for the TCL. In States 1 and 3, the TCL is able to translate common time of the two time bases to local time, and can convert local time to common time based on the latest sync event. States 2 and 4 are transient states in which the TCL already has knowledge about a new sync event but still uses the previous sync event as a basis for common time when requested to translate local time to common time. The notation LOCAL TIME → $t_a$ indicates that the device uses $t_a$ as the base for converting local time to common time. Although the sync event has been received, the device does not 'commit' to using the new time base until after a certain time period as described in more detail infra. For example, the occurrence of a 'SYNC A' event causes the transition from State 1 to State 2. Although $t_a$ is later than tb, the device continues using $t_b$ to calculate common time. Only after the device 'commits'(State 3) does it use ta in converting local time to common time.

Note that whenever the identity of the active RAT changes, each Layer 1 control uses the TCL INIT message to initialize the TCL.

Figure 7:
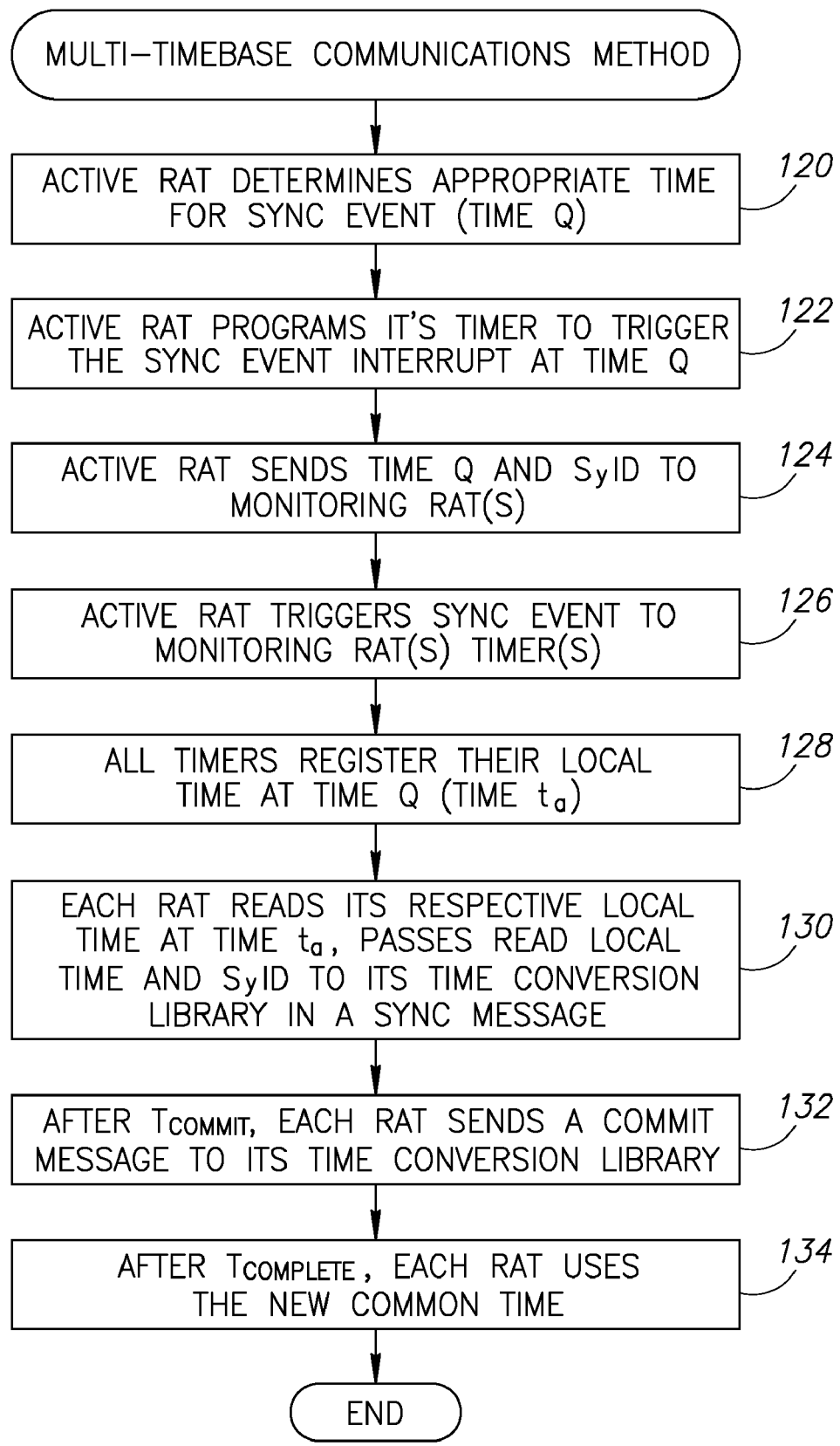
FIG. 7 is a flow chart illustrating the multi-time base communications method of the present invention.

A flow chart illustrating the multi-time base communications method of the present invention is shown in FIG. 7. Initially, the Layer 1 control of the active RAT determines an appropriate time for the occurrence of the sync event (step 120). This time is denoted time Q. The active RAT also determines which SyID to use, alternating between 'a' and 'b'. The Layer 1 control of the active RAT then configures its timer to trigger the sync event interrupt at time Q (step 122). The Layer 1 control of the active RAT then indicates the time Q and its SyID to the Layer 1 control of the monitoring RATs (step 124). At time Q, the timer in the active RAT triggers the sync event interrupt to the timers in the monitoring RATs (step 126). In response to the sync event, timers in all the RATs register their local time at time Q (which is now referred to as $t_a$) (step 128). Note that steps 126 and 128 are the only real-time requirements in this flow.

The Layer 1 control of the active RAT, detecting that time Q has passed reads the local time stored at time $t_a$, and passes this information, together with the new SyID, to the TCL in a SYNC message (step 130). The active RAT TCL transitions to State 2 (FIG. 6). Note that the Layer 1 control of the active RAT knows when time Q has passed since it was the entity that scheduled the interrupt.

Similarly, the Layer 1 control in each of the monitoring RAT(s), having also detected that time Q has passed, reads its respective local time stored at time $t_a$, and passes this information, together with the SyID (which it received in step 124) to its TCL in a SYNC message (step 130). The monitoring RAT TCL transitions to State 2 (FIG. 6). Note that in order to know when time Q has passed, the Layer 1 control of the monitoring RAT may (1) use its early knowledge of the scheduled sync event (which it received in step 124); (2) repeatedly monitor the TCL for a change in value of the contents of the snapshot register; or (3) use any suitable technique. Note that the actions performed in step 130 do not need be performed in any particular order.

Step 130 preferably is completed within a certain time period after time $t_a$ denoted $T_{COMMIT}$. The time $T_{COMMIT}$ is defined as the time period which is significantly longer than the maximum time any of the devices may require to process the sync event interrupt. Each device is required to update its TCL within the time $t_a$ $T_{COMMIT}$. Once updated, the TCL is then able to translate common time using either the latest common time base or an earlier one. It should be noted that at some time after time $t_a$ all TCLs are in State 2 (FIG. 6), meaning all Layer 1 control modules can accept and convert common time timestamps expressed in time since $t_a$. Note that $T_{COMMIT}$ may be selected to be arbitrarily large and does not impose any real time requirements on the system.

Finally, the Layer 1 control of the active RAT, having detected that $T_{COMMIT}$ has passed, sends the COMMIT message to its TCL (step 132). The active RAT TCL transits to State 3 (FIG. 6). In similar fashion, Layer 1 control of the monitoring RATs send a COMMIT message to their respective TCLs after $T_{COMMIT}$ has passed. Note that there is no need for the events in step 132 to be occur in any particular order. After an additional time period $T_{COMPLETE}$ all TCLs are in State 3 and the new common time base is used to perform conversions between local and common time (step 134). Note that $T_{COMPLETE}$ may be selected to be arbitrarily large and thus does not impose any real time requirements on the system.

Thus, at a time significantly later than the end of $T_{COMMIT}$, each device control is required to instruct its respective TCL to use the latest SyID for converting timestamps from local time to common time. This prevents the possibility of a TCL from outputting a common time value that the other TCLs cannot translate.

Figure 8:
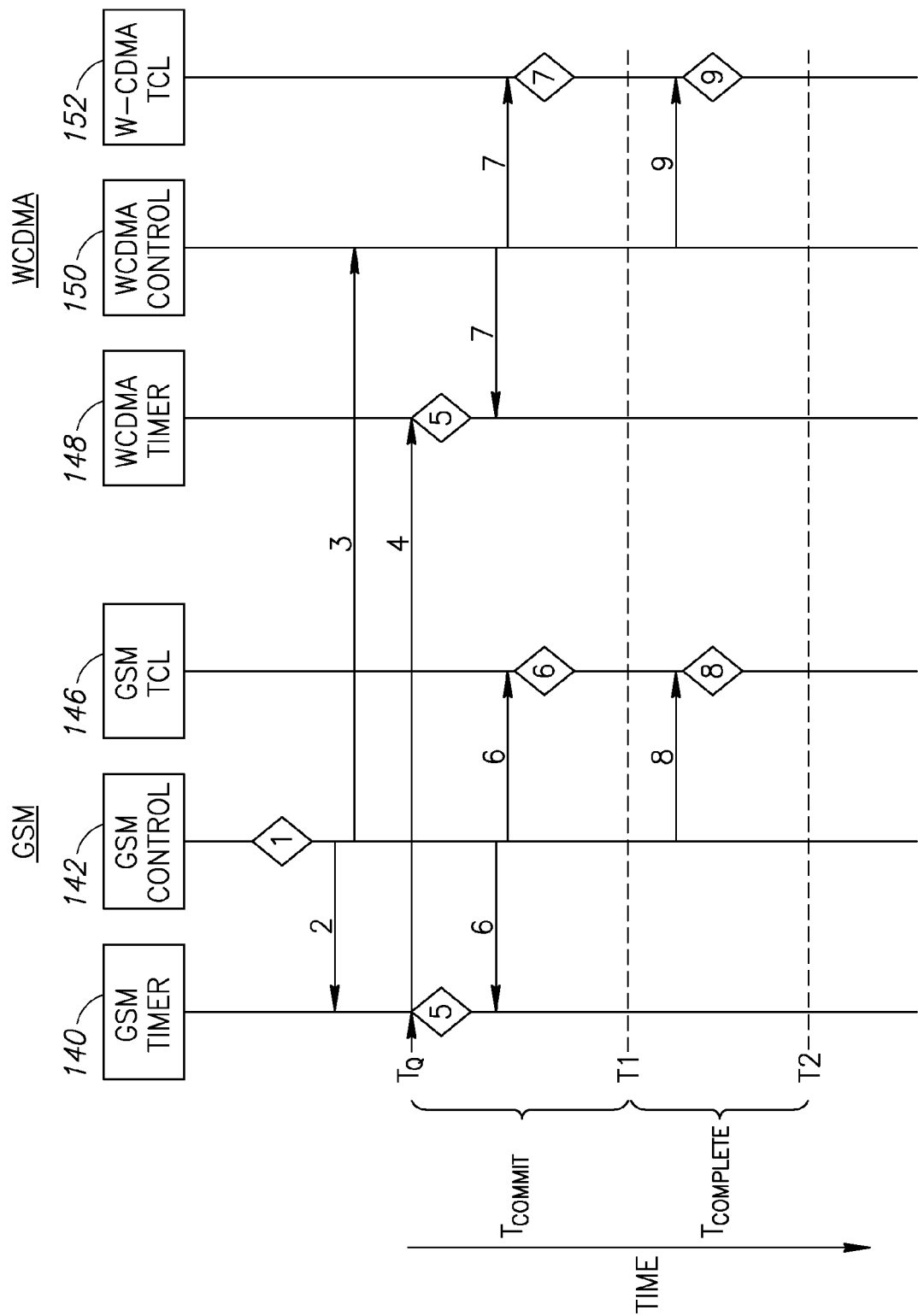
FIG. 8 is a diagram illustrating the event flow surrounding a single sync event interrupt.

In conjunction with the flow diagram, a diagram illustrating the event flow surrounding a single sync event interrupt is shown in FIG. 8. The example event flow diagram illustrates the interaction between the components of the GSM PHY, including timer 140, control 142 and TCL 146, and the WCDMA PHY, including, timer 148, control 150 and TCL 152.

In this example, the GSM is the active RAT while WCDMA is the monitoring RAT. Initially, the Layer 1 control of GSM, being the active RAT, determines an appropriate time for the occurrence of the sync event (Event 1). This time is denoted time Q. Since GSM is the active RAT, it also determines which SyID to use, alternating between 'a' and 'b'. The Layer 1 control of GSM then configures its timer to trigger the sync event interrupt at time Q (Event 2). The Layer 1 control of GSM then indicates the time Q and its SyID to the Layer 1 control of the WCDMA RAT (Event 3). At time Q, the GSM timer triggers the sync event to the WCDMA timer (Event 4). In response to the sync event, both timers register their local time at time Q (now referred to as $t_a$) (Events 5). Note that Event 4 and 5 are the only real time requirements in this flow.

The Layer 1 control of GSM, having detected that time Q has passed, reads the stored local GSM time at time $t_a$, and passes this information, together with the new SyID, to the GSM TCL in a SYNC message (Event 6). The GSM TCL transitions to State 2 (FIG. 6). Note that the Layer 1 control of GSM knows when time Q has passed because it scheduled the sync event itself.

The Layer 1 control of WCDMA, having detected that time Q has passed, reads the stored local WCDMA time at time $t_a$, and passes this information, together with the SyID (which it received from the GSM PHY) to the WCDMA TCL in a SYNC message (Event 7). The WCDMA TCL transitions to State 2 (FIG. 6). In order to know when time Q has passed the Layer 1 control of WCDMA may (1) use its early knowledge of the scheduled sync event it received previously; (2) repeatedly monitor the TCL for a change in value in the contents of the snapshot register or (3) use any suitable technique. Note that Events 6 and 7 for each device do not need to occur in any particular order.

Note that Events 6 and 7 must be completed within $T_{COMMIT}$ time after time $t_a$. The instant in time which occurs $T_{COMMIT}$ time after $t_a$ is denoted TI in FIG. 8. It also noted that at time T1, all TCLs are in State 2, meaning both Layer 1 control modules can accept common time timestamps expressed in time since $t_a$. The Layer 1 control of GSM, having detected that time T1 has passed sends the COMMIT message to the GSM TCL (Event 8). Once the GSM TCL processes the COMMIT message, the GSM TCL transits to State 3. The Layer 1 control of WCDMA also sends the COMMIT message to the WCDMA TCL (Event 9). Once the WCDMA TCL processes the COMMIT message, the WCDMA TCL transits to State 3. Note that Events 8 and 9 should be completed within $T_{COMPLETE}$ time after T1, a time instant shown in FIG. 8 as T2. By time T2, all TCLs are in State 3 and the new common time based is used. Note that Events 8 and 9 do not need to occur in any particular order.

In an alternative embodiment, the functionality of the TCL can be incorporated into the Layer 1 control of each RAT rather than be implemented as a stand alone entity. Further, the invention also contemplates implementing the Layer 1 control in one or more RATs using only common time, thus greatly reducing or eliminating the need to convert between local and common time.

MULTI-MODE MOBILE STATION EMBODIMENT

Figure 9:
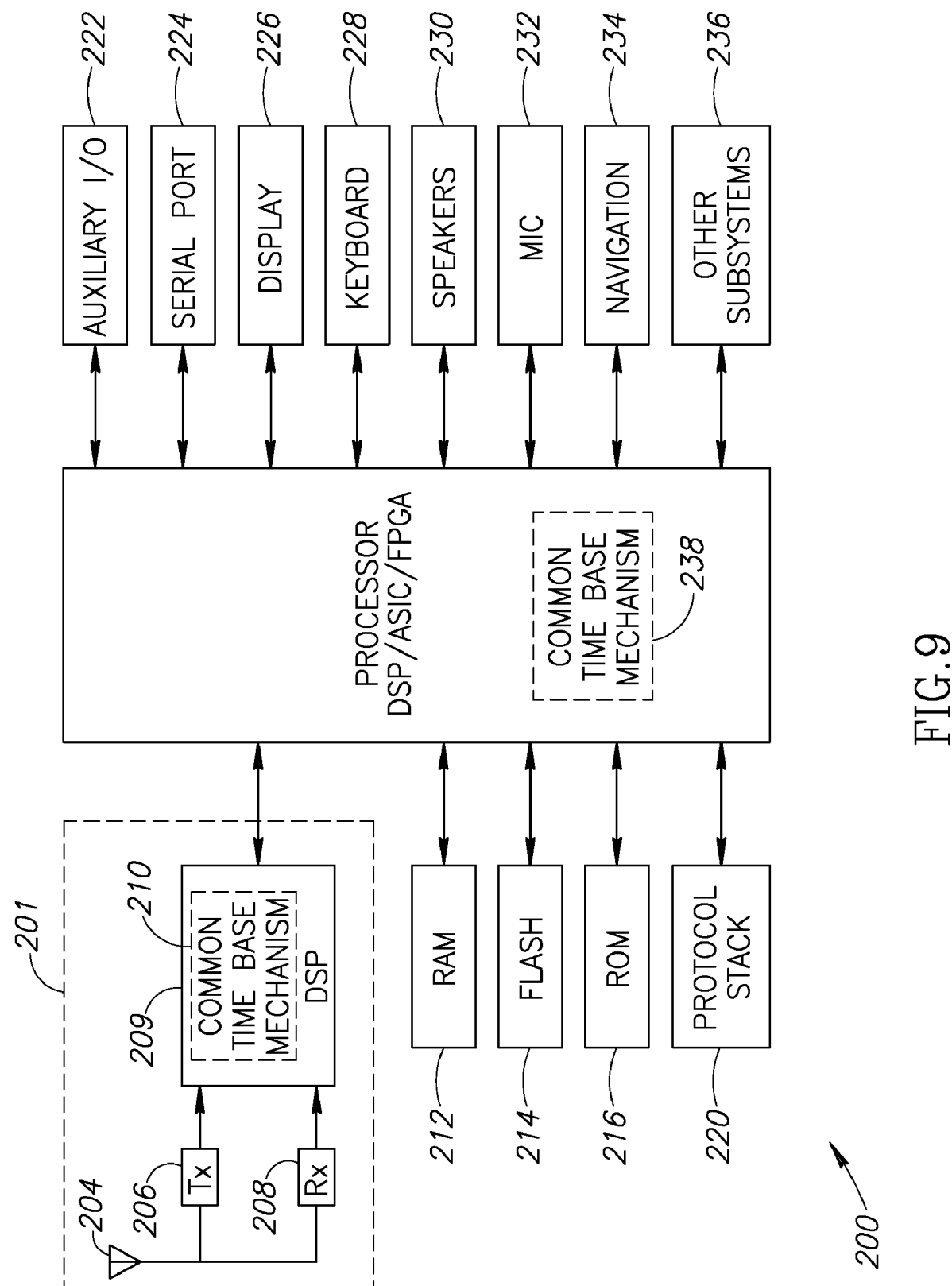
FIG. 9 is a block diagram illustrating an example multi-mode mobile station adapted to implement the common time base scheme of the present invention.

A block diagram illustrating an example mobile communication device is shown in FIG. 9.

The mobile communication device, generally referenced 200, comprises a processing device 202, a communications subsystem 201, input/output devices 222, 224, 226, 228, 230, 232, 234, memory devices 212, 214, 216, 218, protocol stack 220 and various other device subsystems 236. The mobile communication device is preferably a two-way communication device having voice and data communication capabilities. In addition, the device optionally has the capability to communicate with other computer systems via the Internet.

The processing device 202 controls the overall operation of the mobile communication device. Operating system software executed by the processing device is preferably stored in non-volatile memory, such as a flash memory 214, but may also be stored in other types of memory devices, such as read only memory (ROM) 216 or similar storage element. In addition, system software, specific device applications, or parts thereof, may be temporarily loaded into volatile memory, such as random access memory (RAM) 212. Communication signals received by the mobile communication device 200 may also be stored to RAM 212.

The processing device 202 is adapted to run the operating system of the device and also execute the various software applications on the device. One or more applications that control basic operations of the device, such as data and voice communications, may be installed on the device at the time of manufacture. In addition, other types of applications may also be installed, such as a personal information manager (PIM).

Communication functions, including data and voice communications, are performed through the communication subsystem 201. The communication subsystem comprises a processing device such as a digital signal processor (DSP) 209 or other type of processing entity (e.g., a set of devices performing DSP functions), a transmitter 206, a receiver 208 and one or more antennas 204. In this example, the communication subsystem is a capable of multi-mode operation. For example, the communication subsystem implements a dual-RAT mobile station. Note that the design and implementation of the communication subsystem is dependent upon the particular network in which the mobile communication device is to operate. For example, a mobile communication device may comprise a dual-RAT communication subsystem adapted to operate in GSM and WCDMA systems. Note that the multi-mode circuitry may comprise a plurality of RF front end circuits, each associated with a different RAT. The multi-mode mobile communication device also comprises protocol stacks 220, which may or may not be entirely or partially implemented in the processor 202.

When required network registration or activation procedures have been completed, the mobile communication device sends and receives signals over the network. Signals received by the antenna 204 are routed to the receiver 208, which provides for signal amplification, frequency down conversion, filtering, channel selection, etc., and also provides analog to digital conversion. Analog to digital conversion of the received signal allows the DSP 209 to perform complex communication functions, such as demodulation and decoding. Similarly, signals to be transmitted to the network are processed (e.g., modulated and encoded) by the DSP and provided to the transmitter 206 for digital to analog conversion, frequency up conversion, filtering, amplification and transmission to the network(s) via antenna 204.

In addition to processing communication signals, the DSP comprises means 210 for implementing the common time base mechanism of the present invention, described supra, thus enabling inter-PHY or inter-device communications. Alternatively, the processing device 202 comprises means 238 for implementing the common time base mechanism of the present invention.

In data mode, a received signal, such as a text message or web page download, is processed by the communication subsystem 201 and input to the processing device 202. The received signal is then further processed for output to a display 226, or to some other auxiliary I/O device 222. A device user may also compose data items, such as e-mail messages, using a keyboard 228 and navigation mechanism 234 such as a touchpad, a rocker switch, a thumb-wheel, etc. The composed data items are transmitted over the network via the communication subsystem.

In voice mode, overall operation of the device is substantially similar to that of data mode, except that received signals are output to a speaker 230, and signals for transmission are generated by a microphone 232. Alternative voice or audio I/O subsystems, such as a voice message recording subsystem, may also be implemented on the device. In addition, the display 226 may also be utilized in voice communication mode, for example to display the identity of a calling party, the duration of a voice call, or other voice call related information.

COMPUTER EMBODIMENT

Figure 10:
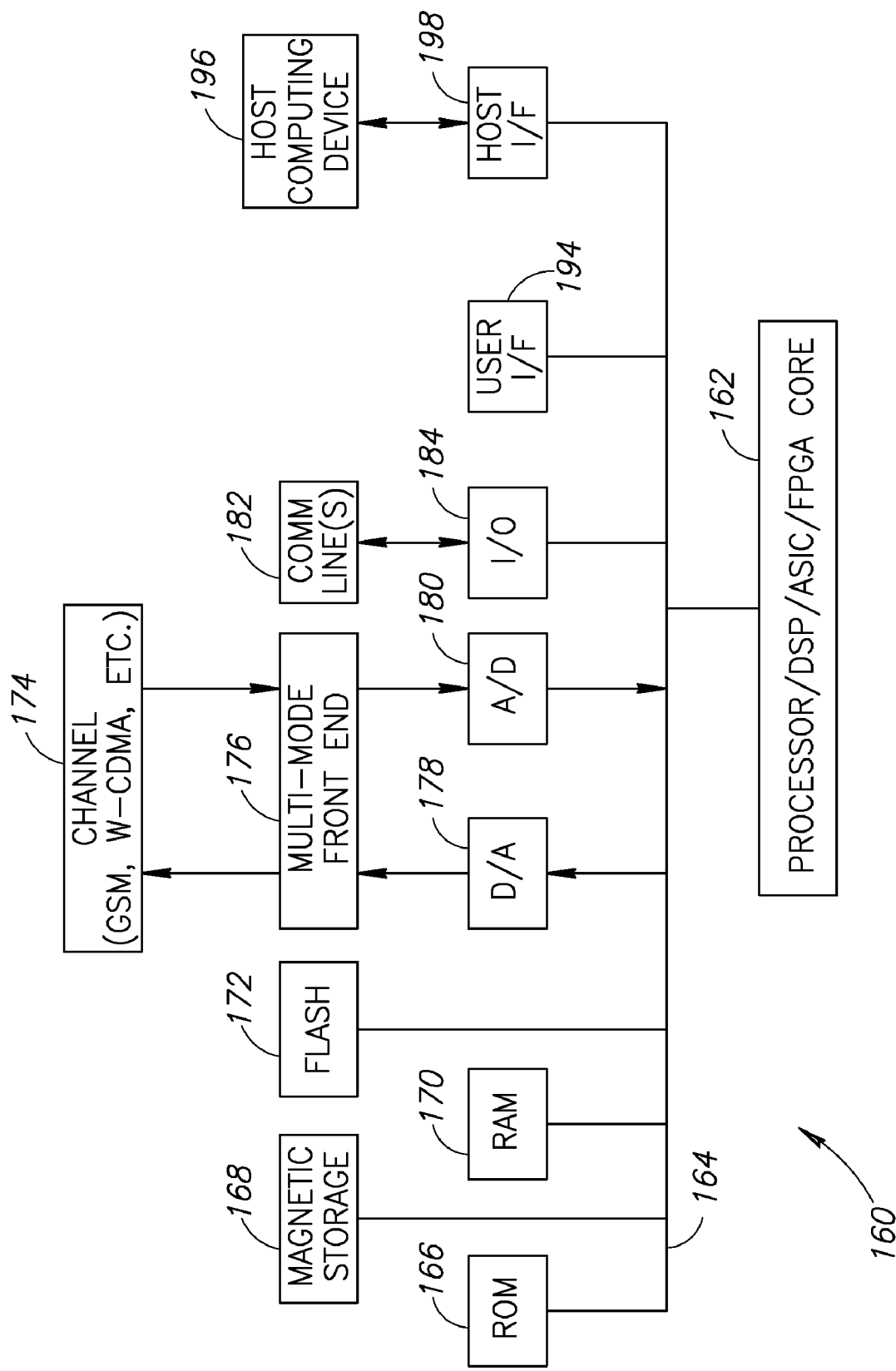
FIG. 10 is a block diagram illustrating an example computer processing system adapted to perform the common time base scheme of the present invention.

In alternative embodiments, the present invention may be applicable to implementations of the invention in integrated circuits or chip sets, wired or wireless implementations, switching system products and transmission system products. For example, a computer is operative to execute software adapted to implement the time base sharing scheme of the present invention. A block diagram illustrating an example computer processing system adapted to perform the time base sharing scheme of the present invention is shown in FIG. 10. The system may be incorporated within a communications device such as a multi-mode cellular handset, receiver or transceiver, some or all of which may be implemented in software, hardware or a combination of software and hardware.

The computer system, generally referenced 160, comprises a processor 162 which may include a digital signal processor (DSP), central processing unit (CPU), microcontroller, microprocessor, microcomputer, ASIC or FPGA core. The system also comprises static read only memory 166 and dynamic main memory 170 all in communication with the processor. The processor is also in communication, via bus 164, with a number of peripheral devices that are also included in the computer system.

In the receive direction, signals received over the channel 174 are first input to the multi-mode RF front end circuitry 176 which comprises a receiver section (not shown) and a transmitter section (not shown). Note that the multi-mode circuitry may comprise a plurality of RF front end circuits, one for each RAT. Baseband samples of the received signal are generated by the A/D converter 180 and read by the processor. Baseband samples generated by the processor are converted to analog by D/A converter 178 before being input to the transmitter for transmission over the channel via the RF front end.

One or more communication lines 182 are connected to the system via I/O interface 184. A user interface 194 responds to user inputs and provides feedback and other status information. A host interface 198 connects a host device 196 to the system. The host is adapted to configure, control and maintain the operation of the system. The system also comprises magnetic or semiconductor based storage device 168 for storing application programs and data. The system comprises computer readable storage medium that may include any suitable memory means, including but not limited to, magnetic storage, optical storage, semiconductor volatile or non-volatile memory, biological memory devices, or any other memory storage device.

The shared time base software is adapted to reside on a computer readable medium, such as a magnetic disk within a disk drive unit. Alternatively, the computer readable medium may comprise a floppy disk, removable hard disk, Flash memory card, EEROM based memory, bubble memory storage, ROM storage, distribution media, intermediate storage media, execution memory of a computer, and any other medium or device capable of storing for later reading by a computer a computer program implementing the method of this invention. The software adapted to implement the time base sharing scheme of the present invention may also reside, in whole or in part, in the static or dynamic main memories or in firmware within the processor of the computer system (i.e. within microcontroller, microprocessor or microcomputer internal memory).

In alternative embodiments, the time base sharing scheme of the present invention may be applicable to implementations of the invention in integrated circuits, field programmable gate arrays (FPGAs), chip sets, application specific standard products (ASSPs) or application specific integrated circuits (ASICs), wired or wireless implementations and other communication system products.

Other digital computer system configurations can also be employed to perform the time base sharing method of the present invention, and to the extent that a particular system configuration is capable of performing the method of this invention, it is equivalent to the representative digital computer system of FIG. 9 and within the spirit and scope of this invention.

Once they are programmed to perform particular functions pursuant to instructions from program software that implements the method of this invention, such digital computer systems in effect become special purpose computers particular to the method of this invention. The techniques necessary for this are well-known to those skilled in the art of computer systems.

It is noted that computer programs implementing the method of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of communicating time related messages between a plurality of devices, each device based on a different time base with respect to each other, said method comprising the steps of:
receiving a sync event interrupt;
in response to said sync event interrupt, storing a snapshot of local time in each device thereby defining $t_0$ of a common time base; and
communicating first time related data from a first device to a second device, whereby said first device converts said first time related data, expressed in local time of said first device, to an absolute time difference expressed in time units since $t_0$ and transmits a message comprising said absolute time difference to said second device, said second device converting said absolute time difference to second time related data expressed in local time of said second device.

2. The method according to claim 1, wherein said time related data sent in a time related message expressed in a local time of said sending device is converted to an absolute time difference expressed in time units since $t_0$ utilizing a time conversion library (TCL).

3. The method according to claim 1, wherein said absolute time difference expressed in time units since to is converted to time related data expressed in local time of a tarciet device utilizing a time conversion library (TCL).

4. The method according to claim 1, wherein said sync event interrupt is generated by at least one of the devices adapted to alternately send sync interrupts to other devices wherein the time between any two consecutive sync events need not be known in advance or repeated.

5. The method according to claim 1, wherein said sync event interrupt is generated by triggering a sync event interrupt via an external module.

6. The method according to claim 1, wherein said sync event interrupt is generated by triggering a sync event interrupt by at least one device and at least one external device.

7. The method according to claim 1, wherein said sync event interrupt occurs substantially simultaneously in all devices.

8. The method according to claim 1, wherein said sync event interrupt occurs in different devices sufficiently close in time to one another such that any perceived synchronization error is sufficiently small to permit all devices to meet their respective performance requirements.

9. The method according to claim 1, wherein each device receives a sync event interrupt having a delay with respect to another trigger.

10. The method according to claim 9, wherein each device calculates a local time at the time of said trigger.

11. The method according to claim 1, wherein said plurality of devices are incorporated in a multi-mode cellular handset.

12. The method according to claim 1, wherein said common time is substantially independent of all local times associated with said plurality of devices.

13. The method according to claim 1, wherein said sync event interrupt is generated by one of said devices.

14. The method according to claim 1, wherein said sync event interrupt is generated by an external entity.

15. A method of time base sharing for use on a plurality of devices, said method comprising the steps of:
receiving notice of a scheduled sync event time;
receiving a sync event interrupt at said scheduled sync event time;
in response to said sync event interrupt, registering local time in each device at said scheduled sync event time thereby defining $t_0$ of a common time base; and
communicating first time related data from a first device to a second device, whereby said first device converts said first time related data, expressed in local time of said first device, to an absolute time difference expressed in time units since $t_0$ and transmits a message comprising said absolute time difference to said second device, said second device converting said absolute time difference to second time related data expressed in local time of said second device.

16. An apparatus for communicating time related messages, comprising:
a plurality of devices having different time bases with respect to each other, each of said devices comprising:
a timer;
time conversion means;
control means coupled to said timer and said time conversion means;
wherein said control means operative to:
receive a sync event interrupt;
wherein said timers operative to register their respective local times in response to receipt of said sync event interrupt, thereby defining a $t_0$ of a common time base;
wherein said time conversion means on each device is operative to generate and maintain a common time expressed as a number of time units since $t_0$ measured as a function of respective registered local times; and
wherein first time related data is communicated from a first device to a second device, by the time conversion means of said first device converting said first time related data, expressed in local time of said first device, to an absolute time difference expressed in time units since $t_0$ and transmitting a message comprising said absolute time difference to the time conversion means of said second device, the time conversion means of said second device converting said absolute time difference to a second time related data expressed in local time of said second device.

17. The apparatus according to claim 16, wherein said control means is operative to convert first time related data in a time related message expressed in local time of a sending device to said common time absolute time difference utilizing a time conversion library (TCL).

18. The apparatus according to claim 16, wherein said control means is operative to convert said absolute time difference in a time related message to local time of a target device utilizing a time conversion library (TCL).

19. The apparatus according to claim 16, wherein control means on said active device is operative to trigger said sync event interrupt whereby interrupts are sent to some or all of said devices such that the time between any two consecutive sync event interrupts need not be known in advance or repeat.

20. The apparatus according to claim 16, farther comprising an external module operative to trigger said sync event interrupt.

21. The apparatus according to claim 16. wherein control means on all devices are operative to alternately trigger said sync event interrupt.

22. The apparatus according to claim 16, wherein said sync event interrupt occurs substantially simultaneously in said plurality of devices.

23. The apparatus according to claim 16, wherein said control means is operative to indicate to said plurality of monitoring devices a time set identifier which identifies one of a plurality of different time sets maintained by said time conversion means.

24. The apparatus according to claim 14, wherein said time conversion means on each device is operative to generate and maintain a common time based on registered local times and a time set identifier.

25. The apparatus according to claim 16, wherein said plurality of devices are incorporated in a multi-mode cellular handset.

26. The apparatus according to claim 16, wherein said time conversion means comprises a state machine operative to maintain at least two common time bases for eliminating potential race conditions.

27. A method of establishing a shared common time base among a plurality of devices, each device comprising a timer based on a different time base, said method comprising the steps of:

receiving a sync event interrupt;

in response to said sync event interrupt, the timer in each respective device recording its respective local time thereby defining to of a common time base; and communicating first time related data from a first device to a second device, whereby said first device converts said first time related data, expressed in local time of said first device, to an absolute time difference expressed in time units since $t_0$ and transmits a message comprising said absolute time difference to said second device, said second device converting said absolute time difference to second time related data expressed in local time of said second device.

28. The method according to claim 27, farther comprising the step of sending a time set identifier adapted to identify which one of a plurality of different time sets maintained by said time conversion means the current sync event interrupt corresponds to.

29. The method according to claim 27, wherein said step of communicating comprises converting, at each device, a time set identifier adapted to identify which of a plurality of different time sets maintained by said time conversion means the current sync event interrupt corresponds to.

30. The method according to claim 27, wherein said plurality of devices are incorporated in a multi-mode cellular handset.

31. A multi-mode cellular handset for use in a cellular communications network, comprising:

a plurality of modules, each module comprising a timer and a time conversion unit, each module adapted to transmit and receive a different radio access technology (RAT) signal;

an inter-module message unit coupled to said plurality of modules, said inter-module message unit operative to:

receive a sync event interrupt;

in response to said sync event interrupt, record a snapshot of the local time in each respective RAT module thereby defining $t_0$ of a common time base; and communicating first time related data from a first RAT module to a second RAT module, whereby said first RAT module converts said first time related data, expressed in local time of said first device, to an absolute time difference expressed in time units since $t_0$ and transmits a message comprising said absolute time difference to said second RAT module, said second RAT module converting said absolute time difference to second time related data expressed in local time of said second RAT module.

32. The handset according to claim 31, wherein said inter-module message unit is operative to receive a time set identifier with said sync event interrupt adapted to identify which one of a plurality of different time sets maintained by the inter-module message unit the current sync event corresponds to.

33. The handset according to claim 31, wherein said inter-module message unit is operative to convert, at each RAT, a time set identifier sent with said sync event interrupt and adapted to identify which one of a plurality of different time sets maintained by said inter-module message unit the current sync event interrupt corresponds to.

34. A computer-readable medium having computer readable instructions stored thereon for execution by a processor to perform a method of time base sharing for use on a plurality of devices, said method comprising the steps of:

receiving a sync event interrupt;

in response to said sync event interrupt, recording local time on each device thereby defining $t_0$ of a common time base; and communicating first time related data from a first device to a second device, whereby said first device converts said first time related data, expressed in local time of said first device, to an absolute time difference expressed in common time comprising time units since $t_0$ and transmits a message comprising said absolute time difference to said second device, said second device converting said absolute time difference to second time related data expressed in local time of said second device.

* * * * *